United States Patent [19]

Giasson et al.

[11] Patent Number: 5,195,678
[45] Date of Patent: Mar. 23, 1993

[54] AUTOMOTIVE OIL LEVEL CONTROL APPARATUS

[75] Inventors: Eric J. Giasson, Somerset, Mass.; Alfred J. White, North Providence, R.I.; Narendra R. Zaveri, No. Attleboro, Mass.; Joseph M. Gondusky, Warwick; Phillip J. Leipf, Chepachet, both of R.I.

[73] Assignee: Texas Instruments Incorporated, Dallas, Tex.

[21] Appl. No.: 810,979

[22] Filed: Dec. 20, 1991

[51] Int. Cl.⁵ .............................................. G05D 23/08
[52] U.S. Cl. .................................. 236/93 R; 236/101 E
[58] Field of Search .............. 236/93 R, 101 E, 101 R

[56] References Cited

U.S. PATENT DOCUMENTS

| | | | |
|---|---|---|---|
| 1,886,368 | 11/1932 | Blancke | 236/93 R X |
| 2,101,338 | 12/1937 | Lovekin | 236/93 R X |
| 2,337,077 | 12/1943 | Woodman | 236/93 R X |
| 2,464,482 | 3/1949 | Birkemeier | 236/93 R X |
| 2,677,501 | 5/1954 | Raymond et al. | 236/93 R |
| 2,715,420 | 8/1955 | Stearns | 236/101 E X |
| 3,595,475 | 7/1971 | Morton | 236/93 R |
| 3,980,103 | 9/1976 | Drzewiecki | 236/93 R X |
| 4,865,250 | 9/1989 | Zaveri et al. | 236/101 E X |
| 5,015,808 | 5/1991 | Ty et al. | 236/93 R |

*Primary Examiner*—William E. Tapolcai
*Attorney, Agent, or Firm*—Russell E. Baumann; Richard L. Donaldson; René E. Grossman

[57] ABSTRACT

A fluid level control valve has a base with an aperture formed therethrough. A cover is movably disposed over the aperture and is biased by a thermostatic element in a direction tending to close the aperture. The thermostatic element is a generally U-shaped strip having one end mounted on the base with its opposite end biased against the cover. The cover is adapted to pivot about one hinge at temperatures below a selected temperature value and pivot about a second hinge at temperatures above the selected value. A second embodiment particularly adapted to accommodate different flow rates employs a movable first hinge location.

25 Claims, 4 Drawing Sheets

AUTOMOTIVE OIL LEVEL CONTROL APPARATUS

This invention relates generally to an automotive transmission fluid control and more particularly to a temperature responsive valve for use with a transmission oil reservoir.

Hydraulic pressure systems as used in motor vehicles require a supply of transmission fluid. Maintaining an adequate oil level in the transmission oil pan at all operating temperatures is essential for desired transmission performance. Conventionally the oil pan serves as a sump to provide the necessary supply, however, in front wheel drive vehicles the transmission oil pan is too shallow to hold a suitable quantity. The problem is exacerbated by the fact that the volume of the oil used expands in the order of thirty eight percent at elevated temperatures. The problem has been dealt with by employing an auxiliary reservoir, for example, in the side of the transmission case cover. The fluid level in the auxiliary reservoir is controlled by a thermostatic element which controls the opening and closing of a cover plate in the transmission housing in response to the temperature of the oil in the auxiliary reservoir. As the temperature in the oil reservoir decreases the cover plate opens allowing the oil to drain into the lower sump or oil pan to maintain the desired oil level.

A control valve of the type described above is shown in U.S. Pat. No. 4,921,165 assigned to the assignee of the present invention in which a generally U-shaped strip of thermostatic material has a first end mounted on one of a pair of post members extending upwardly from the base plate and has a second, opposite end biased against the cover plate which is slidably mounted between the post members to regulate the height of the fluid in the side cover based on the temperature of the fluid. This control provides a side cover head height storage rate linearly portional to temperature. This control is very effective for side covers whose cross sectional areas are uniform along their height. However, in certain other applications the cross sectional areas vary with height. For example, the cross sectional area of the side cover in a given application increases dramatically at a specific head height. In this application a linear increase in head height with respect to temperature would result in storing an unexceptably high amount of fluid.

SUMMARY OF THE INVENTION

It is therefore an object of the invention to provide a valve control apparatus which will provide a linear quantity of fluid as temperature increases from a chamber having a non-linear increase in storage capacity relative to head height. Another object of the invention is the provision of an economical, reliable control valve which will consistently provide desired oil level control in an automotive transmission oil pan the cross sectional area of which is non-uniform relative to head height. Yet another object is the provision of a reliable control valve which provides a selected profile of head height relative to temperature which will accommodate different flow rates.

Other objects and features of the invention will become more readily understood from the following detailed description and drawings in which like reference numerals designate like parts throughout the figures thereof.

Briefly, in accordance with the invention, a generally U-shaped strip of thermostatic material has a first end mounted on a first of a pair of post members extending upwardly from a base plate covering a fluid aperture and has a second, opposite end biased against the cover plate which is slidable between the post members. A first fluid path is provided at temperatures below a selected level in which the base plate hinges about a location on the second of the pair of post members and a second fluid path is provided at temperatures above the selected level with the effective hinge location shifting to a location on the bas adjacent the first post member.

In accordance with a second embodiment the hinge location on the second of the pair of post members is spring biased so that it is effectively movable over a selected length of the second post member. According to another feature of the invention the thermostat metal strip is formed of a monometal mounting portion integrally connected to the portion biased against the cover plate.

BRIEF DESCRIPTION OF THE DRAWINGS

With reference to FIGS. 1 and 2, a prior art valve assembly 10 is shown as described in U.S. Pat. No. 4,921,165, the subject matter of which is incorporated herein by this reference. Assembly 10 comprises a molded base 12 formed of suitable plastic material having a pair of post members 14, 16 extending upwardly therefrom. The first post member 14 serves as a mounting member for a thermostat element and, along with second post member 16, as a cover plate guide, as noted below. A generally U-shaped thermostatic element 18 having a first leg 18.1, a bight portion 18.2 and a second leg 18.3 is mounted on post 14 by a first aperture 20 formed in the bight portion 18.2 of the U-shaped element 18 and a second aperture 22 formed in the distal end portion of leg 18.1 with the post member received through both apertures. Suitable teeth 24, 26 are formed adjacent the apertures and are adapted to bite or dig into the post member to maintain element 18 in its selected position. At the time element 18 is assembled on post member 14, the first leg 18.1 is compressed slightly (toward the bight 18.2 of the U-shaped configuration). When the calibrated position is reached the leg is released to spring out biting into the post to stabilize the position of the element on the post member.

Figure 1:
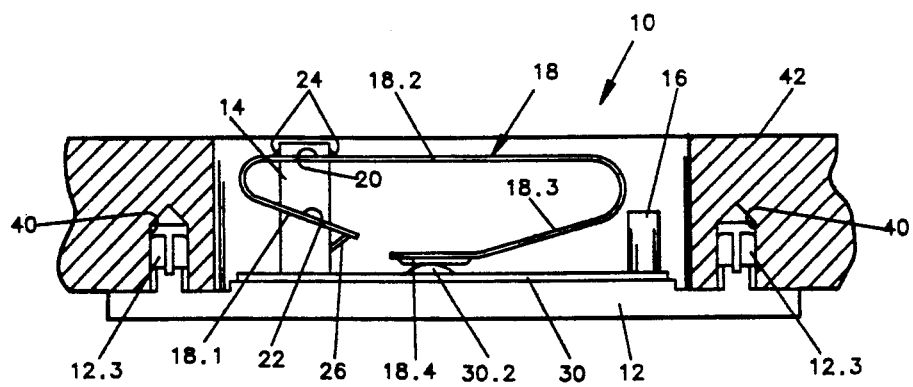
FIGS. 1 and 2 are front and top views respectively of a prior art oil level control.
Figure 2:
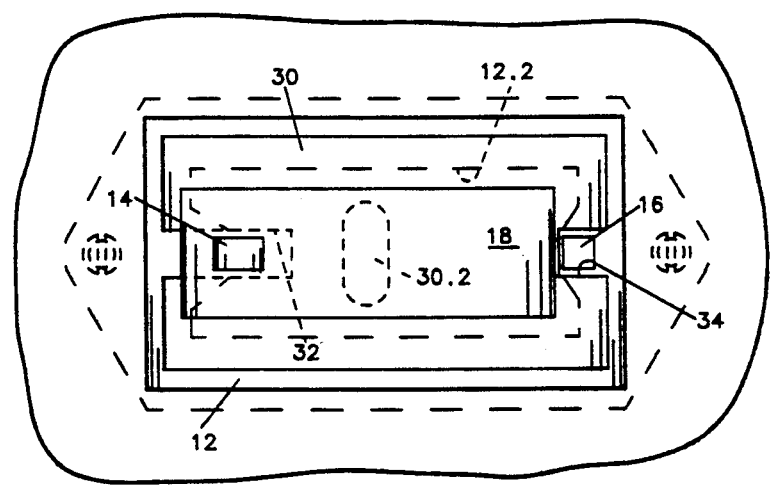

A cover plate or member 30, formed of stainless steel or other suitable material, has slots 32, 34 formed at two opposite ends to accommodate post members 14, 16 respectively and is disposed on base 12 and adapted to move up and down along the post members. Cover 30 fits over aperture 12.2 formed in base 12 and is adapted to essentially close the aperture when it is in contact with base 12. Cover 30 is shown formed with a transversely extending curve protrusion 30.2, for example, a generally cylindrical portion having a first longitudinal axis extending in a direction across the width of the cover member which cooperates with a longitudinally extending curved portion 18.4, for example, a generally cylindrical portion having a second longitudinal axis along the length of the strip at a right angle with the first longitudinal axis formed on end 18.3 of the thermostatic element so that a sliding point contact is obtained between the thermostatic element and the cover. Base 12 is also shown formed with split stud members 12.3 upwardly extending from two opposite ends of the base which are adapted to be received in an interference fit in bores 40 of an automotive transmission casting 42.

Figure 3:
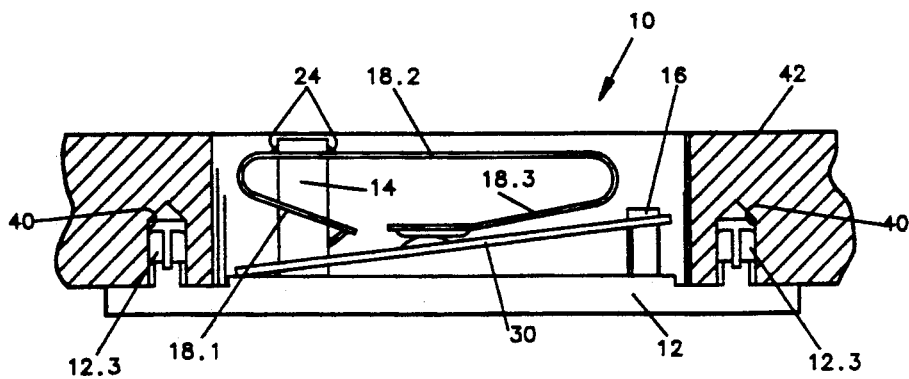
FIG. 3 is a view similar to FIG. 1 showing the position of the cover member when the control is in operation.

The thermostat element 18 is calibrated to provide a predetermined preload or gap dimension between element 18 and the cover plate 30 covering the oil drain cavity in the transmission casting 42. As the oil temperature increases, its volume expands and the oil level in the reservoir increases. This increases the pressure on cover plate 30 in an opening direction. Due to the temperature increase thermostat element 18 exerts pressure on cover plate 30 in the opposite direction to thereby modulate the opening as seen in FIG. 3 to allow the oil to drain at a required rate to maintain a desired oil level in the sump.

Figure 6:
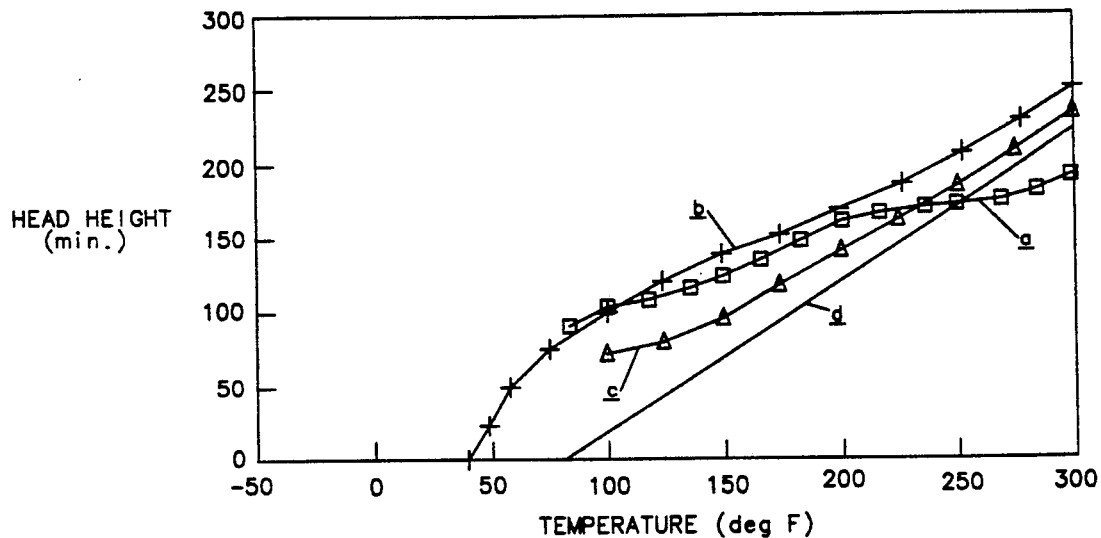
FIG. 6 is a graph showing head height versus temperature for a linear and a non-linear system.

As seen in FIG. 6, the valve assembly 10 provides a head height storage rate represented by plotted line c which is generally linearly proportional to the temperature (plotted line d). While this satisfied the need for a storage chamber having a uniform cross sectional area with height it is unsatisfactory for an application in which there is a significant increase in cross sectional area at a certain head height since a linear increase in head height with respect to temperature would result in an excessive quantity of fluid.

Curve b represents a non-linear requirement for providing the desired quantity of fluid with varying temperatures whereas curve c represents the result of a valve apparatus made in accordance with the invention.

Figure 4:
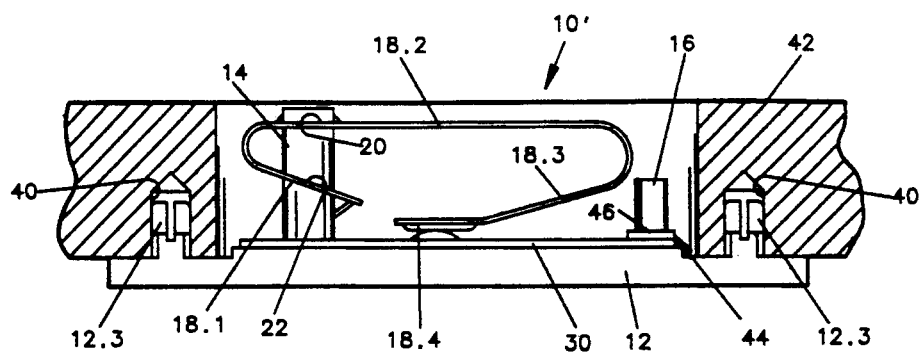
FIGS. 4 and 5 are front views of an oil level control made in accordance with the invention in operation controlling the rate of flow of oil at temperatures below and above a selected level respectively.
Figure 5:
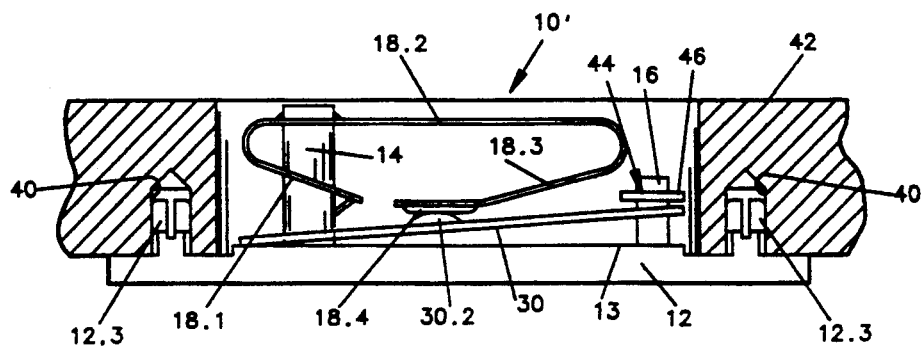

As seen in FIGS. 4 and 5, an additional hinge location 44 is provided on post member 16 in order to form two flow paths, one at temperatures below a selected level, for example 150° F., as shown in FIG. 4 and a second path at temperatures above the selected level as shown in FIG. 5. Thus at temperatures below the selected value, cover plate 30 hinges at point A shown in FIG. 4 and at temperatures above the selected value cover plate 30 hinges about B shown in FIG. 5 resulting in bimodal performance and the non-linear curve a shown in FIG. 6.

Hinge location 44 is formed by providing a reaction surface member 46 in the form of a radially extending flange projecting outwardly from post member 16 at a selected location along its length. Member 46 can be integrally formed with post member 16 or it can be a separate member having a post receiving aperture which can be forced onto the post at a selected position. In the latter case the position can be adjusted to provide calibration for a selected temperature value.

Figure 4A:
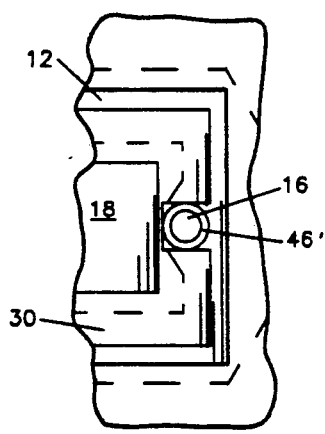
FIG. 4a is a view similar to a portion of FIG. 2 showing a portion of the oil level control having a modified second post and reaction surface.

As seen in FIG. 4a, the second post can also be conveniently formed as a cylindrical member and the reaction surface member can be of an annular form 46' if desired. It will be understood that curve a could be modified by changing the particular position of hinge 44 along the length of post member 16. Further, the specific location of portion 18.4 of member 18 along with protrusion 30.2 of curve member 30 can be varied to provide different lever arm lengths to tailor curve a as desired while still providing two separate flow paths.

Figure 7:
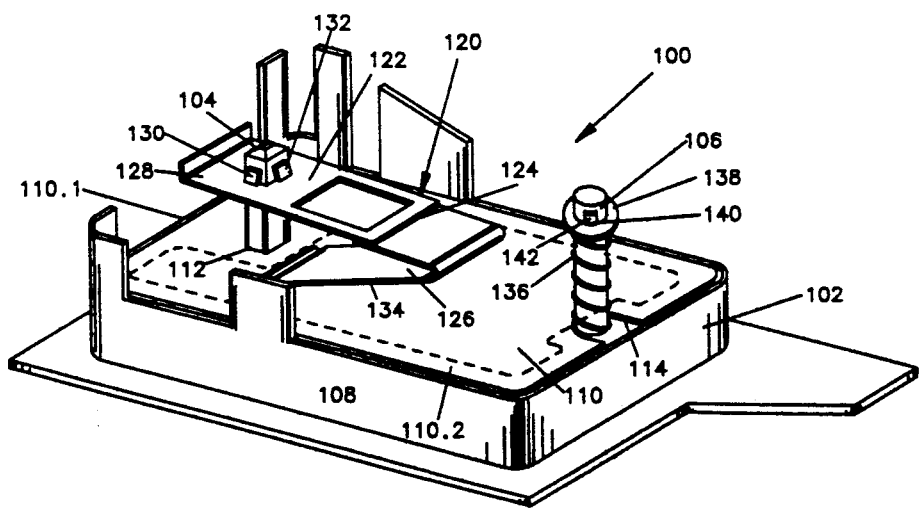
FIG. 7 is a perspective view of a second embodiment of the invention which is particularly suitable for accommodating different flow rates.

With particular reference to FIG. 7 a control 100 is shown having a base 102 preferably formed of suitable moldable synthetic material with first and second integrally attached, generally parallel post members 104 and 106 respectively extending upwardly therefrom. An aperture 108 (shown in dashed lines) extends through the base from top to bottom with a cover plate 110 received on the top surface of the base to effectively close the aperture. Plate 110 is formed with a post receiving aperture 112 through which post 104 is received at one end 110.1 of the plate and a post receiving slot 114 through which post 106 is received at an opposite end 110.2 of the plate.

A temperature responsive biasing member 120 has a first portion 122 preferably formed of a monometallic layer attached at 124 by conventional means, as by butt welding, to a thermostat strip portion 126. A first distal end 128 of biasing member 120 is attached to post 104 by means of a post receiving aperture 130 having a plurality of inwardly projecting tangs 132. Biasing member 120 is pushed onto post 104 and moved downwardly to a given position, for example, until a selected gap is obtained between end 134 of member 120 and cover plate 110 until a selected force is placed on cover plate 110 with tangs 132 digging into the post to maintain end 128 in a fixed, calibrated position.

Biasing means in the form of a coil spring 136 is received on post 106 and is adapted to place a selected force on end 110.2 of plate 110. Suitable retaining means such as washer 138 having a post receiving aperture 140 with inwardly projecting tangs 142 is pushed onto post 106 and moved downwardly until a selected force is placed on plate end 110.2 by spring 136. Thus one downward force relatively independent of temperature is placed on plate 110 via spring 136 and another downward force dependent on temperature is placed on plate 110 via end 134 of member 120 adjacent end 110.1 of the plate. It will be understood that the particular location of plate 110 at which end 134 engages can be varied to obtain different effective moment arms as long as it is on the opposite side of the center line between ends 110.1 and 110.2 of the plate in order to obtain the switching from one hinge point to the other.

As in the previously described embodiment cover plate 110 is movable toward and away from base 102 sliding along posts 104, 106. Initially, at lower temperatures, e.g., 75° F., plate 110 will hinge about spring 136/post 106 which moves downwardly along the post with increasing temperature until a given higher temperature, e.g., in the vicinity of 150° F. is reached where the hinge shifts to end 110.1 of plate 110.

Figure 8:
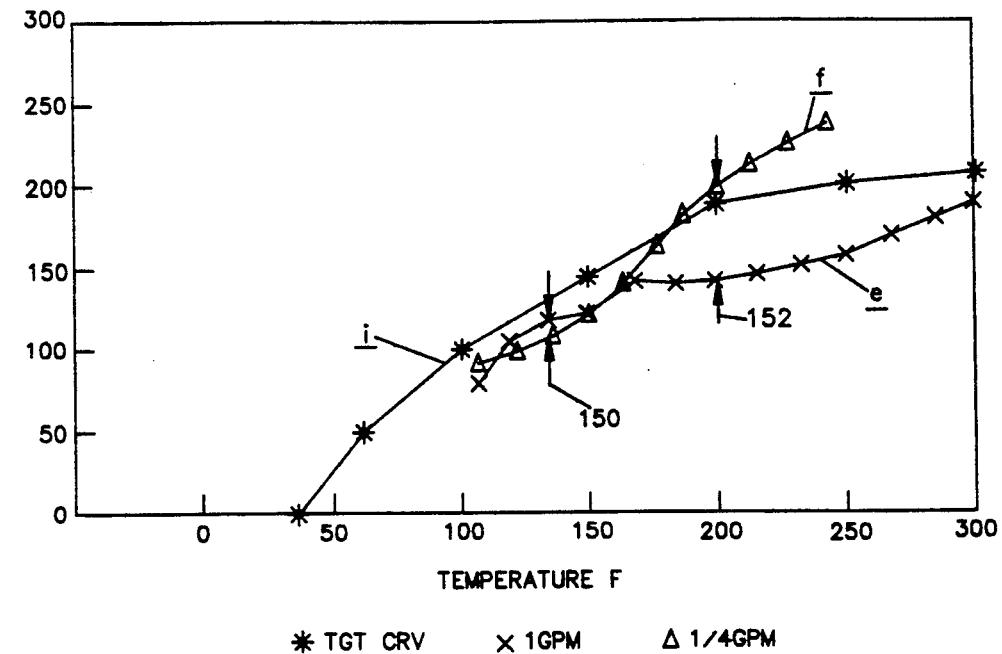
FIGS. 8 and 9 are graphs similar to FIG. 6 showing curves plotted for two different flow rates having both a fixed and a movable first hinge location.
Figure 9:
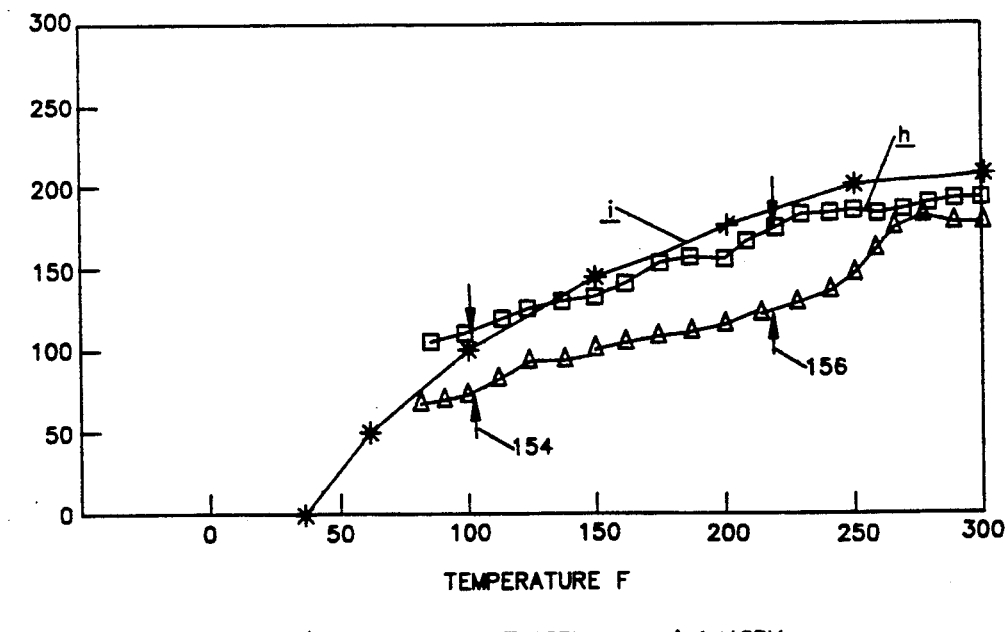

With particular reference to FIG. 8, curves e and f represent fixed hinge points for two different flow rates respectively, for example, ¼ gallon per minute and 1 gallon per minute. It will be noted that a relatively small delta as indicated by double arrow 150 exists at lower temperatures for the two different flow rates; however, at higher temperatures the delta has significantly increased as indicated by double arrow 152. However, utilizing the movable hinge point provided by spring 136 the head can be maintained according to the selected profile curve i. As seen by curves g and h in FIG. 9 which represent movable hinge points for the same two different flow rates delta 154 existing at low temperatures is very close to delta 156 at higher temperatures.

Various adjustments can be made by choosing a spring with a different spring rate and by changing the initial force placed on the plate by the spring. Further, in addition to changing the initial force placed on plate 110 by biasing member 120 its moment arm can be changed by choosing a longer or shorter strip.

Although the invention has been described with respect to specific preferred embodiments thereof, many variations and modifications will become apparent to those skilled in the art. It is the intent that the appended claims be interpreted as broadly as possible in view of the prior art to include all such variations and modifications.

We claim:

1. An oil level control valve comprising a base, and oil receiving aperture formed through the base, first and second post members extending from the base adjacent opposite ends of the oil receiving aperture, a cover member received over the oil receiving aperture and being adapted to move toward and away from the oil receiving aperture, a generally U-shaped thermostatic strip having a bight portion intermediate a first and a second leg, first and second apertures formed in the bight and first leg respectively, the first leg being compressed by bending it toward the second leg with the apertures in alignment with one another and with the first post member received through the first and second apertures to mount the thermostatic strip thereon, the second leg having a distal end portion engaging the cover member with a preselected force to bias the cover member toward the base with a force which varies with the temperature of the thermostatic strip, means to gudie movement of the cover member along at least a portion of the length of the post members, reaction surface means disposed on the second post member having an outwardly extending portion at a selected location along the length of said second post member whereby at temperatures below a selected level oil passing through the aperture causes the cover to pivot around the reaction surface and at temperatures above the selected level the cover is caused to pivot on the base adjacent the first post member, 2. An oil level control valve according to claim 1 in which slots are formed in the cover member with the first and second post members received in respective slots.

3. An oil level control valve comprising a base, an oil receiving aperture formed through the base, first and second post members extending from the base adjacent opposite ends of the oil receiving aperture, a cover member received over the oil receiving aperture and being adapted to move toward and away from the oil receiving aperture, a generally U-shaped thermostatic strip having a bight portion intermediate a first and a second leg, first and second apertures formed in the bight and first leg respectively, the first leg being compressed by bending it toward the second leg with the apertures in alignment with one another and with the first post member received through the first and second apertures to mount the thermostatic strip thereon, the second leg having a distal end portion engaging the cover member with a preselected force to bias the cover member toward the base with a force which varies with the temperature of the thermostatic strip, means to guide movement of the cover member along at least a portion of the length of the post members, reaction surface means including a radially extending surface extending from the second post member at a selected location along its length whereby at temperatures below a selected level oil passing through the aperture causes the cover to pivot around the reaction surface and at temperatures above the selected level the cover is caused to pivot on the base adjacent the first post member.

4. An oil level control valve according to claim 2 in which the reaction surface means comprises a radially extending surface extending from the second post member.

5. An oil level control valve according to claim 3 in which the reaction surface means comprises an annular member received on the second post member.

6. An oil level control valve according to claim 2 in which the reaction surface means comprises an annular member received on the second post member.

7. An oil level control valve according to claim 5 in which the annular member is movable along the length of the second post member to a selected calibrated position.

8. An oil level control valve according to claim 6 in which the annular member is movable along the length of the second post member to a selected calibrated position.

9. An oil level control valve according to claim 1 in which the first post member is rectangular in cross section and the aperture formed in the first leg is circular whereby portions of the thermostatic strip dig into respective corners of the first post member to stabilize its position at a selected calibrated position.

10. An oil level control valve according to claim 1 in which teeth are formed adjacent at least one aperture on the thermostatic strip and are adapted to bite into the first post member.

11. An oil level control valve according to claim 1 further including fastening means for attaching the base member to a transmission housing.

12. An oil level control valve comprising a base, an oil receiving aperture formed through the base, a cover member received over the oil receiving aperture and being adapted to move toward and away from the oil receiving aperture, a thermostatic strip attached to the base and having a portion engaging the cover member with a preselected force to bias the cover member toward the base with a force which varies with the temperature of the thermostatic strip, means to guide movement of the cover member toward and away from the aperture, reaction surface means disposed on the base adjacent the aperture having a hinge means mounted on the guide means and being directly engaged by the cover member whereby at temperatures below a selected level oil passing through the aperture causes the cover member to pivot around the reaction surface and at temperatures above the selected level the cover member is caused to pivot on the base adjacent the opposite side of the aperture.

13. An oil level control valve according to claim 12 in which the means to guide movement of the cover member comprises first and second post members extending from the base adjacent opposite ends of the oil receiving aperture.

14. An oil level control valve according to claim 13 in which slots are formed in the cover member with the first and second post members received in respective slots.

15. An oil level control valve according to claim 13 in which the reaction surface means comprises a radially extending surface extending from the second post member.

16. An oil level control valve according to claim 13 in which the reaction surface means comprises an annular member received on the second post member.

17. An oil level control valve according to claim 16 in which the annular member is movable along the length of the second post member to a selected calibrated position.

18. An oil level control valve according to claim 13 in which the first post member is rectangular in cross section and the aperture formed in the first leg is circular whereby portions of the thermostatic strip dig into respective corners of the first post member to stabilize its position at a selected calibrated position.

19. A fluid control valve comprising a base, a fluid receiving aperture formed through the base, a cover member having first and second ends on opposite sides of a center line received over the fluid receiving aperture and being adapted to move toward and away from the fluid receiving aperture, means to guide movement of the cover member toward and away from the fluid receiving aperture, a first biasing member attached to the base and having a portion engaging the cover member between the center line and one end of the cover member with a preselected force at a selected temperature to bias the cover member toward the base with a force which varies with the temperature of the biasing member, a second biasing member attached to the base and having a portion engaging the cover member between the center line and the other end of the cover member to bias the cover member toward the base with a force which is relatively independent of temperature whereby at temperatures below a selected level fluid passing through the fluid receiving aperture causes the member to pivot around the second biasing member and at temperatures above the selected level the cover member is caused to pivot on the base adjacent the opposite side of the fluid receiving aperture.

20. A fluid control valve according to claim 19 in which the means to guide movement of the cover member comprises first and second post members extending from the base adjacent opposite ends of the fluid receiving aperture.

21. A fluid control valve according to claim 20 in which the second biasing member is a coil spring received on one of the post members whereby the effective location of pivot around the second biasing member varies along the length of the said one of the post members.

22. A fluid control valve according to claim 19 in which the first biasing member comprises a strip of monometal which is attached at one end to the base and at another end to a strip of thermostat member.

23. A fluid control valve according to claim 21 in which a member is received on the said one of the post members to retain the spring on the said one of the post members with a selected force placed on the cover member.

24. A fluid control valve according to claim 23 in which the member received on the said one of the post members is a washer having tangs extending inwardly adapted to bite into the said one of the post members.

25. A fluid control valve according to claim 22 in which the first biasing member is mounted on the other of the post members, an aperture having inwardly extending tangs is formed in the monometal strip and receives the said other of the post members with the tangs adapted to bite into the other of the post members.

* * * * *